US007914156B2

(12) United States Patent
Wang et al.

(10) Patent No.: US 7,914,156 B2
(45) Date of Patent: Mar. 29, 2011

(54) OPTICAL ENGINE FOR A PROJECTION DISPLAY DEVICE

(75) Inventors: Wan-Chiang Wang, Hsinchu (TW); Chia-Chang Lee, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 605 days.

(21) Appl. No.: 12/016,088

(22) Filed: Jan. 17, 2008

(65) Prior Publication Data
US 2008/0304024 A1    Dec. 11, 2008

(30) Foreign Application Priority Data
Jun. 8, 2007    (TW) ................................ 96120730 A

(51) Int. Cl.
*G03B 21/14*    (2006.01)
(52) U.S. Cl. ........................................ 353/100; 353/119
(58) Field of Classification Search ................... 353/100, 353/119; 359/507, 513, 811, 819
See application file for complete search history.

(56) References Cited

U.S. PATENT DOCUMENTS

| | | | |
|---|---|---|---|
| 6,185,047 B1 | 2/2001 | Peterson et al. | |
| 6,471,356 B1 | 10/2002 | Gohman et al. | |
| 6,844,979 B2 | 1/2005 | Maki et al. | |
| 6,935,745 B1 * | 8/2005 | Kitabayashi et al. | 353/20 |
| 7,131,738 B2 | 11/2006 | Chan et al. | |
| 7,379,240 B2 * | 5/2008 | Iwaki et al. | 359/457 |
| 7,540,617 B2 * | 6/2009 | Yamada et al. | 353/38 |
| 2003/0231287 A1 * | 12/2003 | Maki et al. | 353/119 |
| 2005/0219720 A1 * | 10/2005 | Yura et al. | 359/820 |
| 2005/0248691 A1 * | 11/2005 | Jang | 348/744 |
| 2006/0126172 A1 * | 6/2006 | Iwaki et al. | 359/457 |
| 2007/0183032 A1 * | 8/2007 | Michimori et al. | 359/443 |
| 2007/0273844 A1 * | 11/2007 | Clark et al. | 353/100 |
| 2008/0304024 A1 * | 12/2008 | Wang et al. | 353/100 |

FOREIGN PATENT DOCUMENTS

| | | |
|---|---|---|
| TW | 200720823 A | 11/1994 |
| TW | 246604 B | 1/2006 |
| TW | 272444 B | 2/2007 |
| TW | 325090 | 9/2008 |

* cited by examiner

*Primary Examiner* — John R Lee
(74) *Attorney, Agent, or Firm* — Connolly Bove Lodge & Hutz LLP

(57) ABSTRACT

An optical engine for a projection display device includes a housing, a light source module, an imaging unit, and a projecting mechanism. The housing includes a base wall and a surrounding wall cooperating with the base wall for defining a receiving space with an opening. The light source module is disposed at a side of the housing for providing an illuminating light beam into the receiving space. The imaging unit is disposed in the receiving space, and includes a display element and an optical lens set. The projecting mechanism includes a lens barrel having first and second barrel ends, a projecting lens disposed at the second barrel end, and a coupling element formed on an outer surface of the lens barrel adjacent to the first barrel end. The coupling element is configured to have a size and shape corresponding to those of the opening, and is disposed to cover the opening and to seal the receiving space.

6 Claims, 7 Drawing Sheets

OPTICAL ENGINE FOR A PROJECTION DISPLAY DEVICE

CROSS-REFERENCE TO RELATED APPLICATION

This application claims priority of Taiwanese application no. 096120730, filed on Jun. 8, 2007.

BACKGROUND OF THE INVENTION

1. Field of the Invention

The invention relates to an optical engine for a projection display device, more particularly to an optical engine which has fewer components and lower manufacturing costs.

2. Description of the Related Art

As shown in FIG. 1 and FIG. 2, a conventional optical engine 1 for a projection display device usually includes a light source module 11 for providing light, a housing 12 disposed at one side of the light source module 11, an imaging unit 13 disposed in the housing 12, and a projecting mechanism 14 disposed on the housing 12. The housing 12 includes a first housing part 121 and a second housing part 122 for covering the first housing part 121. The first housing part 121 defines a receiving space 123 for receiving a display element 132 and an optical lens set 131 of the imaging unit 13. The second housing part 122 covers the receiving space 123 by covering the first housing part 121 in an overlapping manner. The second housing part 122 is fastened to the first housing part 121.

The projecting mechanism 14 includes a lens barrel 141, a projecting lens 142, and a coupling element 143. One end of the lens barrel 141 extends through an opening 124 of the second housing part 122. The other end of the lens barrel 141 is for mounting the projecting lens 142 thereon. The coupling element 143 is formed on an outer surface of the lens barrel 141, and is fastened to the second housing part 122. A dust-proofing washer 15 made of rubber is disposed between the coupling element 143 and the second housing part 122, and is used to block entry of dust or other contaminants into the receiving space 123 through the opening 124 of the second housing part 122. The receiving space 123 is thus sealed so that dust or other contaminants are prevented from accumulating on the display element 132 and the optical lens set 131. Accordingly, dust or other contaminants are prevented from affecting display quality when images are magnified during image projection.

When the coupling element 143 of the projecting mechanism 14 and the second housing part 122 of the housing 12 are coupled to each other, the dust-proofing washer 15 is needed to meet air-tight and dust-proof requirements between the second housing part 122 and the coupling element 143. Therefore, during manufacture, use of the dust-proofing washer 15 results in extra design burden and additional manufacturing costs. Moreover, since the lens barrel 141 of the projecting mechanism 14 and the second housing part 122 are two separate components, separate molds are required for injection molding, which complicates component design and further increases manufacturing costs. Therefore, it is desirable to improve the design of the conventional optical engine 1 so as to reduce both the number of components and manufacturing costs.

SUMMARY OF THE INVENTION

Therefore, one object of the present invention is to provide an optical engine for a projection display device, the design of which has fewer components and lower manufacturing costs.

Other objects and advantages of the present invention will become apparent from the technical features disclosed by the present invention.

To achieve one of or a portion of or all of the above objects or other objects, an optical engine for a projection display device according to an embodiment of the present invention comprises a housing, a light source module, an imaging unit, and a projecting mechanism.

The housing includes a base wall, and a surrounding wall that extends from a side of the base wall and that cooperates with the base wall for defining a receiving space with an opening.

The light source module is disposed at a side of the housing for providing an illuminating light beam into the receiving space.

The imaging unit is disposed in the receiving space, and includes a display element and an optical lens set. The optical lens set is operably associated with the light source module and the display element.

The projecting mechanism includes a lens barrel having a first barrel end and a second barrel end, a projecting lens disposed at the second barrel end of the lens barrel, and a coupling element formed integrally with the lens barrel and disposed at the first barrel end of the lens barrel. The coupling element is configured to have a size and shape corresponding to those of the opening of the housing, and is disposed for covering the opening and sealing the receiving space.

In one embodiment of the present invention, the lens barrel includes a first barrel portion that is formed integrally with the coupling element and that defines the first barrel end. The first barrel end is disposed in the receiving space.

In one embodiment of the present invention, the lens barrel further includes a seat that is mounted to the first barrel portion, and a second barrel portion that is mounted to the seat and that defines the second barrel end. The projecting lens is mounted to the second barrel portion.

In one embodiment of the present invention, the coupling element includes a first coupling portion formed integrally with the first barrel portion, and a second coupling portion coupled to the first coupling portion. The second coupling portion may or may not be formed integrally with the first coupling portion. The first and second coupling portions are coupled together for forming the coupling element having the size and shape corresponding to those of the opening of the housing. In addition, the second coupling portion is coupled to the first coupling portion in an overlapping manner.

By forming integrally the coupling element with the first barrel portion, there is no need to provide a dust-proofing washer in the optical engine, and there is no need to provide a separate mold for a second housing part, thereby reducing the number of components of the optical engine and thereby reducing design and manufacturing costs. On the other hand, by forming the first coupling portion of the coupling element integrally with the first barrel portion, and by coupling the first coupling portion to the second coupling portion in an overlapping manner, the design is suitable for models where the size of the opening of the housing is relatively large, and reduces the size of a mold that forms together the lens barrel and the coupling element.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The above and other technical content, features and effects of the present invention will become apparent in the following detailed description of the preferred embodiments with reference to the accompanying drawings, of which.

DETAILED DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component faces "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 3:
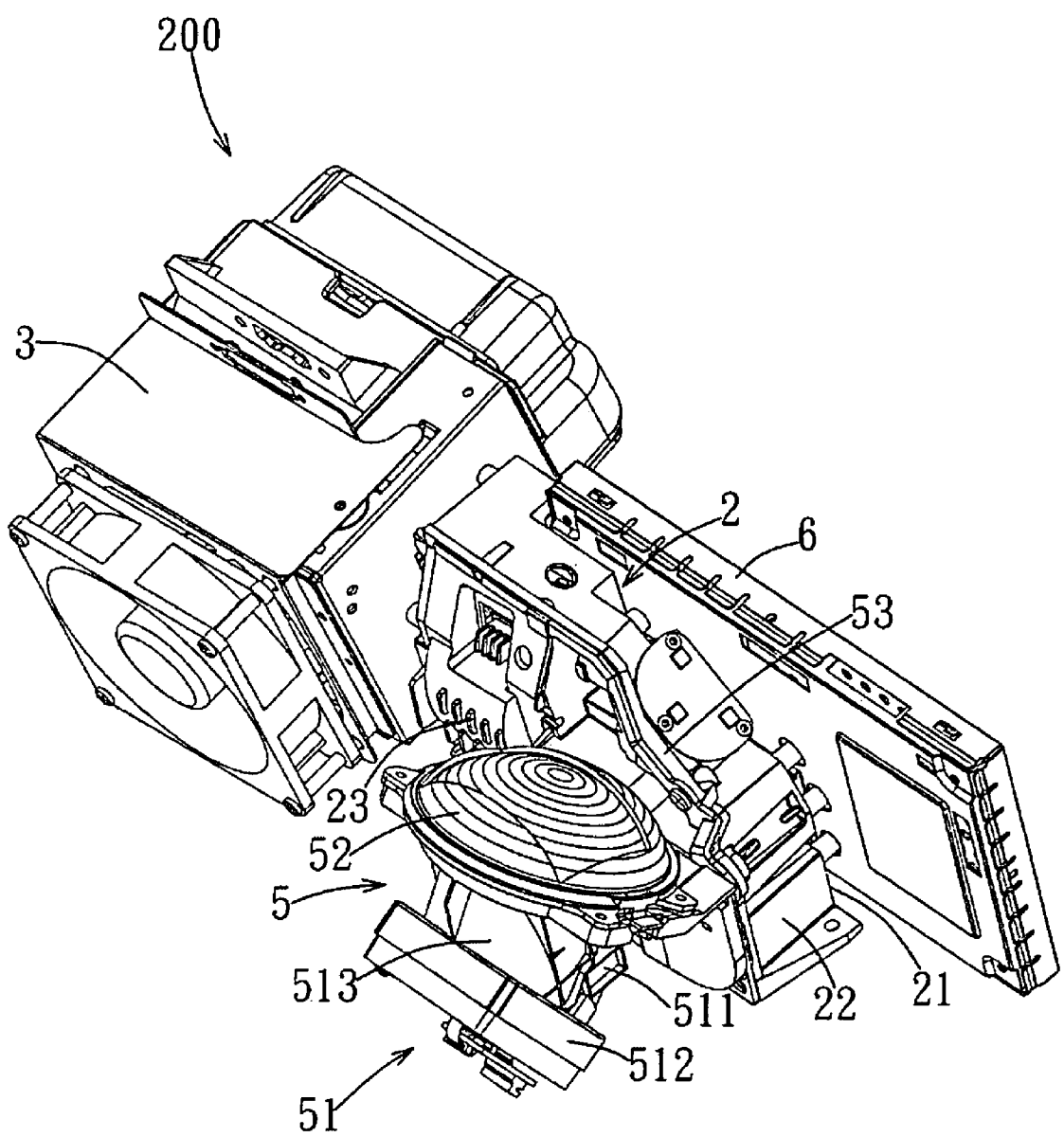
FIG. 3 is an assembled perspective view of an optical engine for a projection display device according to a first preferred embodiment of the present invention.
Figure 4:
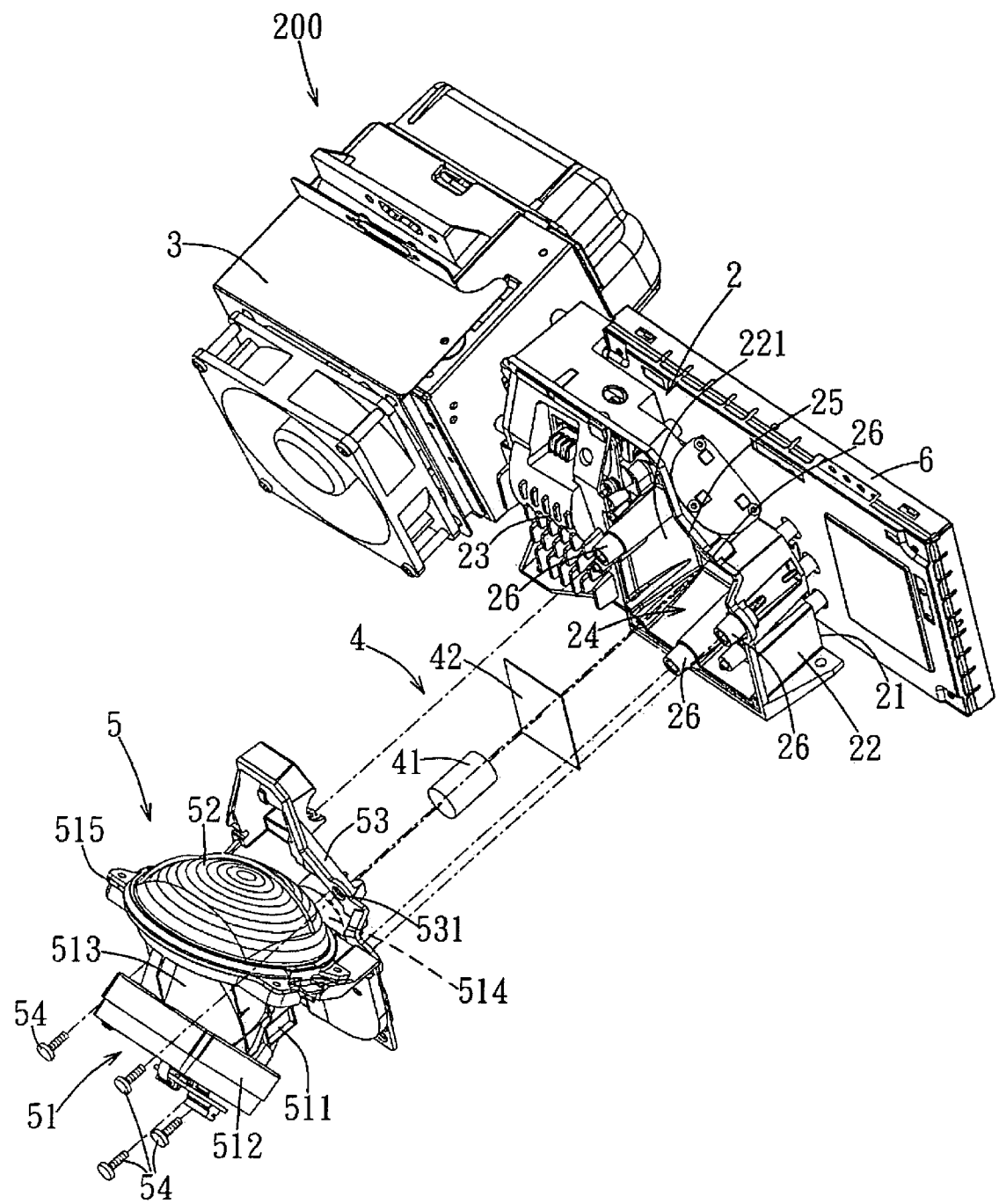
FIG. 4 is a partly exploded perspective view of the first preferred embodiment.
Figure 5:
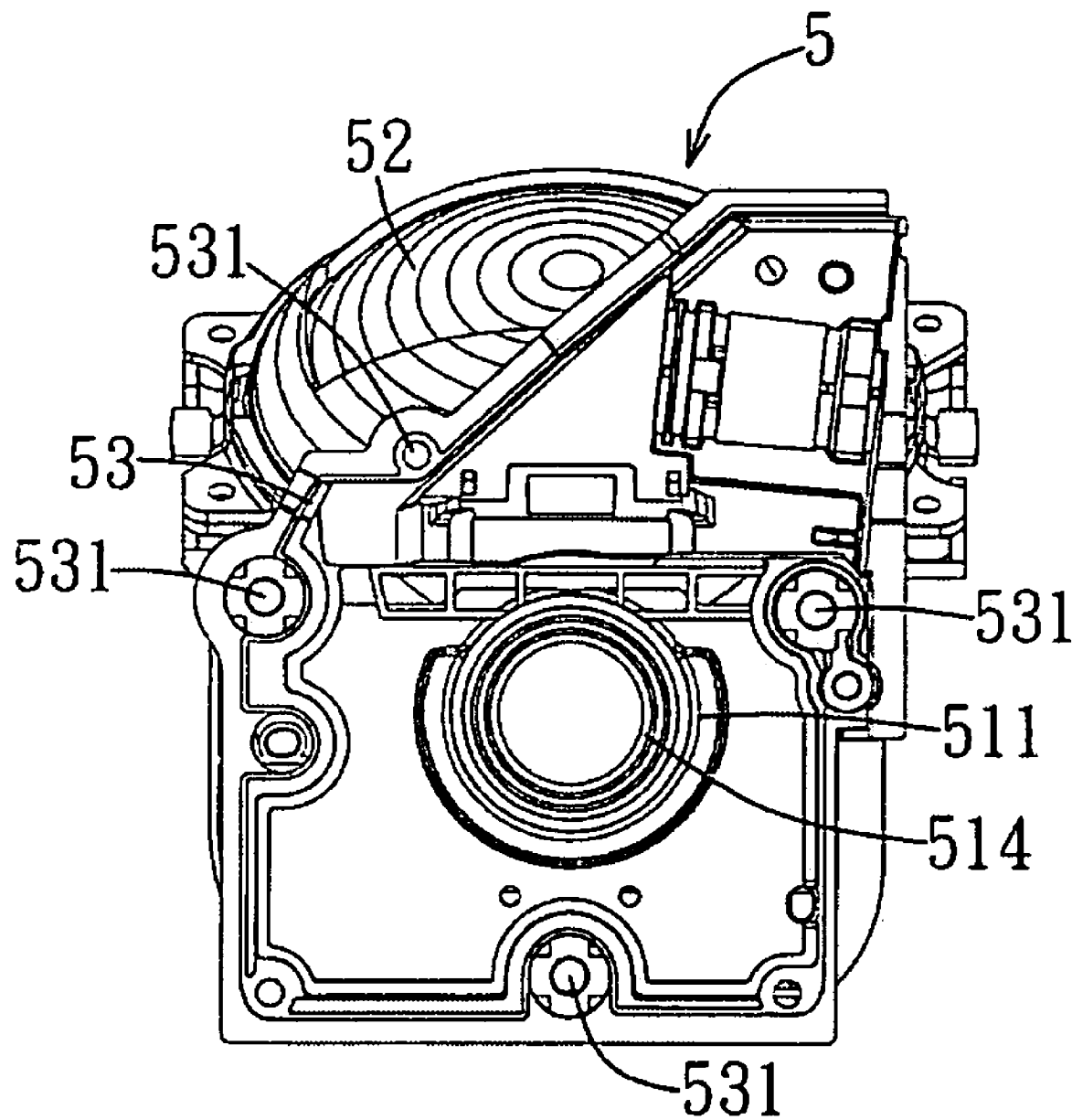
FIG. 5 is a schematic rear view of a projecting mechanism of the first preferred embodiment.

Referring to FIG. 3, FIG. 4 and FIG. 5, an optical engine 200 for a projection display device according to a first preferred embodiment of the present invention is shown to comprise a housing 2, a light source module 3 disposed at a side of the housing 2 for providing an illuminating light beam, an imaging unit 4 disposed in the housing 2, a projecting mechanism 5 disposed at a front side of the housing 2, and a device shell 6 for receiving a circuit board (not shown) and disposed at a rear side of the housing 2.

The housing 2, which is made of plastic or a light metal such as an aluminum alloy, includes a base wall 21, a surrounding wall 22 extending from a front side of the base wall 21, and an outer cover 23 to cover a part of the surrounding wall 22. The surrounding wall 22 has a partition portion 221 that extends upwardly from the base wall 21. The base wall 21, the surrounding wall 22 and the partition portion 221 cooperate to define a receiving space 24. The receiving space 24 has an opening 25 in spatial communication with the outside thereof. In addition, the base wall 21 is provided with a plurality of threaded fastening portions 26. The receiving space 24 is for receiving a display element 42 and an optical lens set 41 of the imaging unit 4. The optical lens set 41 is operably associated with the light source module 3 and the display element 42. In this embodiment, the display element 42 is a digital micro-mirror device (DMD) coupled electrically to the circuit board mounted in the device shell 6.

The projecting mechanism 5 includes a lens barrel 51 having a first barrel end 514 and a second barrel end 515, a projecting lens 52 disposed at the second barrel end 515 of the lens barrel 51, and a coupling element 53 disposed at the first barrel end 514 of the lens barrel 51. In this embodiment, the lens barrel 51 includes a first barrel portion 511 that defines the first barrel end 514, a seat 512 that is mounted to an end of the first barrel portion 511 and that is generally inclined, and a second barrel portion 513 that extends from the seat 512 and that defines the second barrel end 515. The coupling element 53 is formed integrally on an outer surface of the first barrel portion 511 adjacent to the first barrel end 514. The coupling element 53 is configured to have a size and shape corresponding to those of the opening 25 of the housing 2 so as to be able to cover the same. The coupling element 53 is formed with a plurality of through holes 531 each of which corresponds in position to a respective one of the threaded fastening portions 26. In this embodiment, the lens barrel 51 of the projecting mechanism 5, as well as the coupling element 53 at one end of the lens barrel 51, can be made of plastic or metal.

Figure 6:
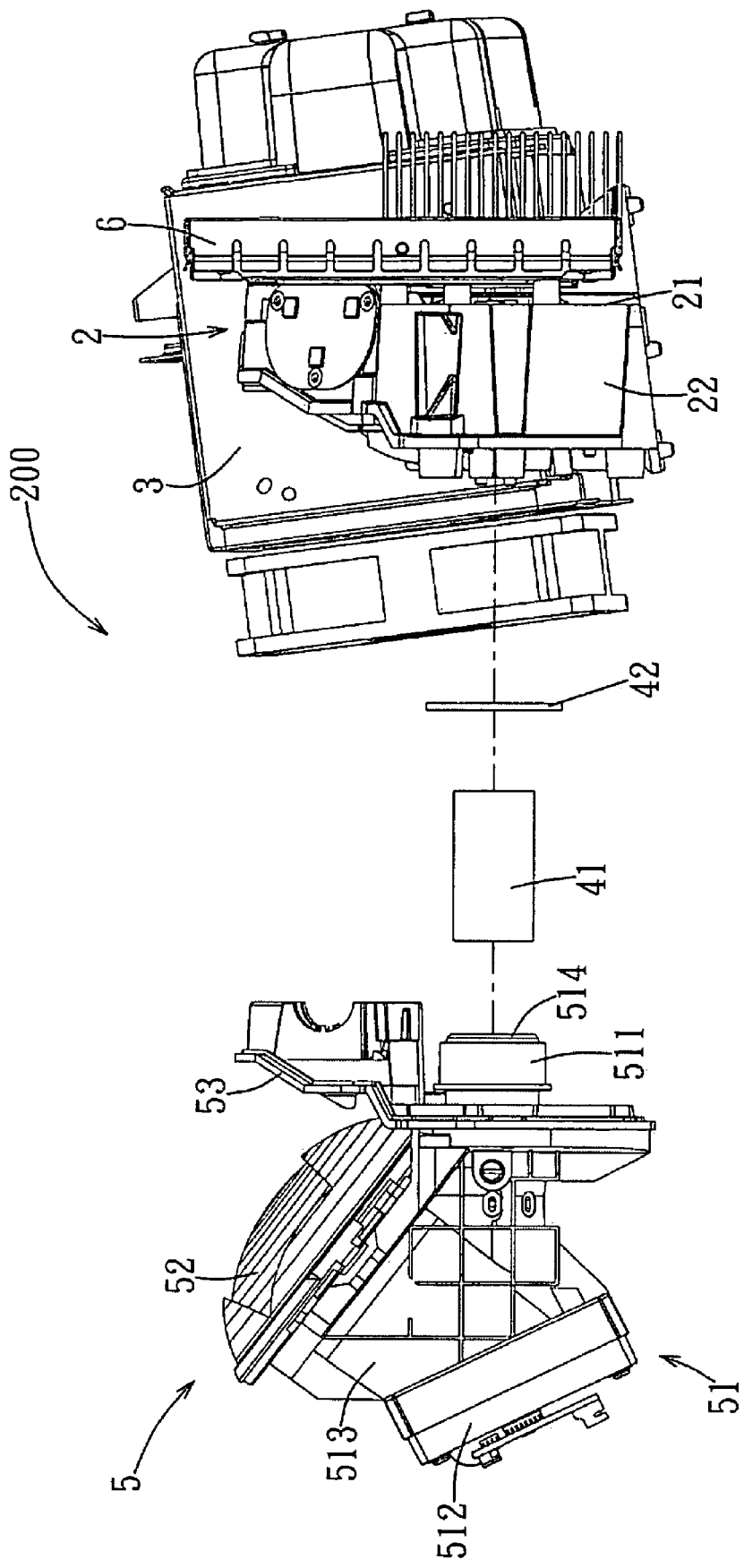
FIG. 6 is a partly exploded schematic side view of the first preferred embodiment.

Referring to FIG. 4, FIG. 5 and FIG. 6, to mount the projecting mechanism 5 onto the housing 2, the coupling element 53 of the projecting mechanism 5 is assembled to the housing 2 in an overlapping manner so as to cover the opening 25 and seal the receiving space 24. At the same time, the first barrel end 514 of the first barrel portion 511 is disposed in the receiving space 24 and corresponds in position to the display element 42. Then, a plurality of screws 54 are extended through the through holes 531 of the coupling element 53 and engage the threaded fastening portions 26 of the housing 2 so as to secure the coupling element 53 of the projecting mechanism 5 to the surrounding wall 22 of the housing 2. In use, via the optical lens set 41, the illuminating light beam provided by the light source module 3 enters the housing 2, and is transmitted to the optical lens set 41 in the receiving space 24, and then to the display element 42. The display element 42 converts the illuminating light beam into an imaging light beam which is image-modulated. The imaging light beam is then reflected to the first barrel end 514 of the first barrel portion 511, is subsequently transmitted to a reflector (not shown) on the seat 512, is reflected by the reflector, and is finally projected onto a projection screen (not shown) through the projecting lens 52.

Figure 1:
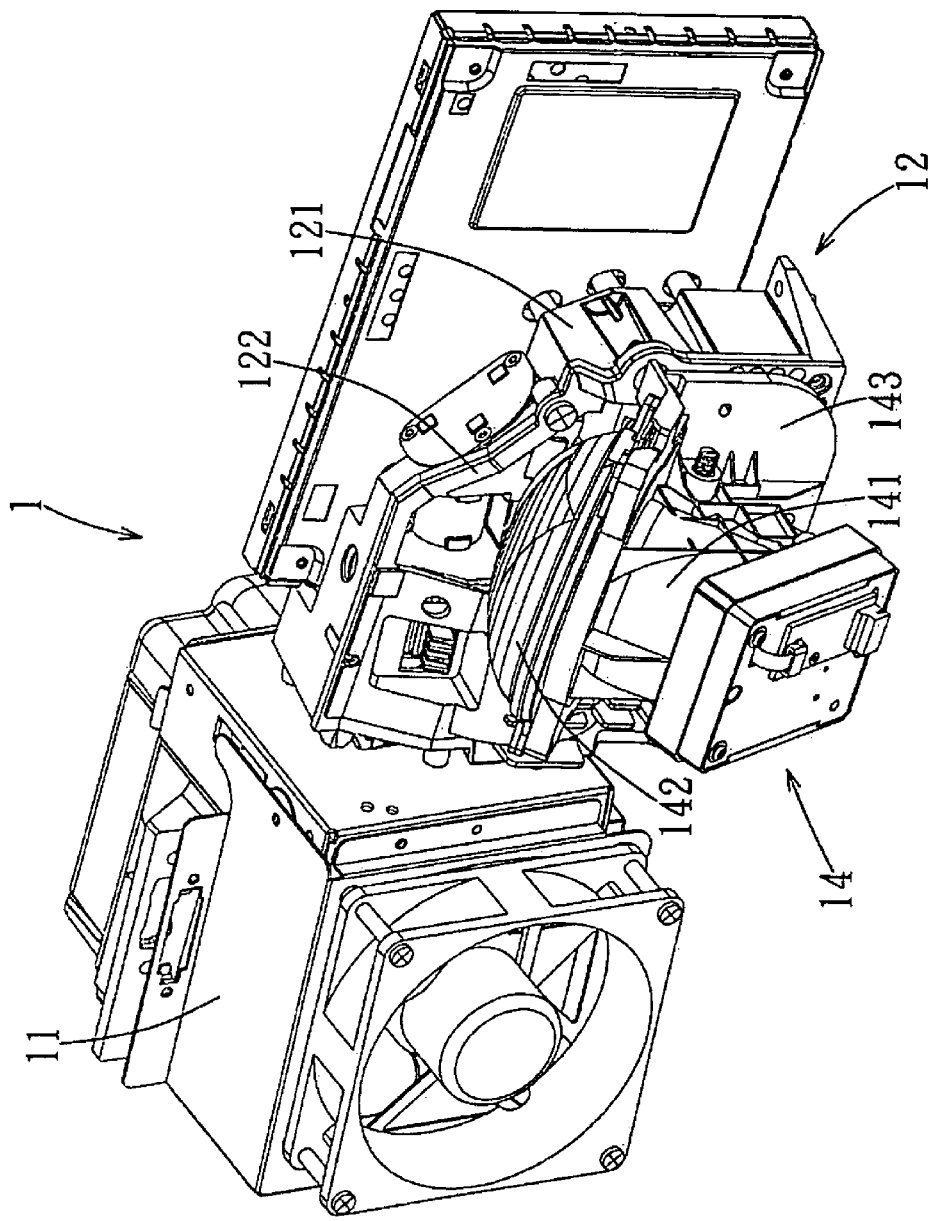
FIG. 1 is an assembled perspective view of a conventional optical engine for a projection display device.
Figure 2:
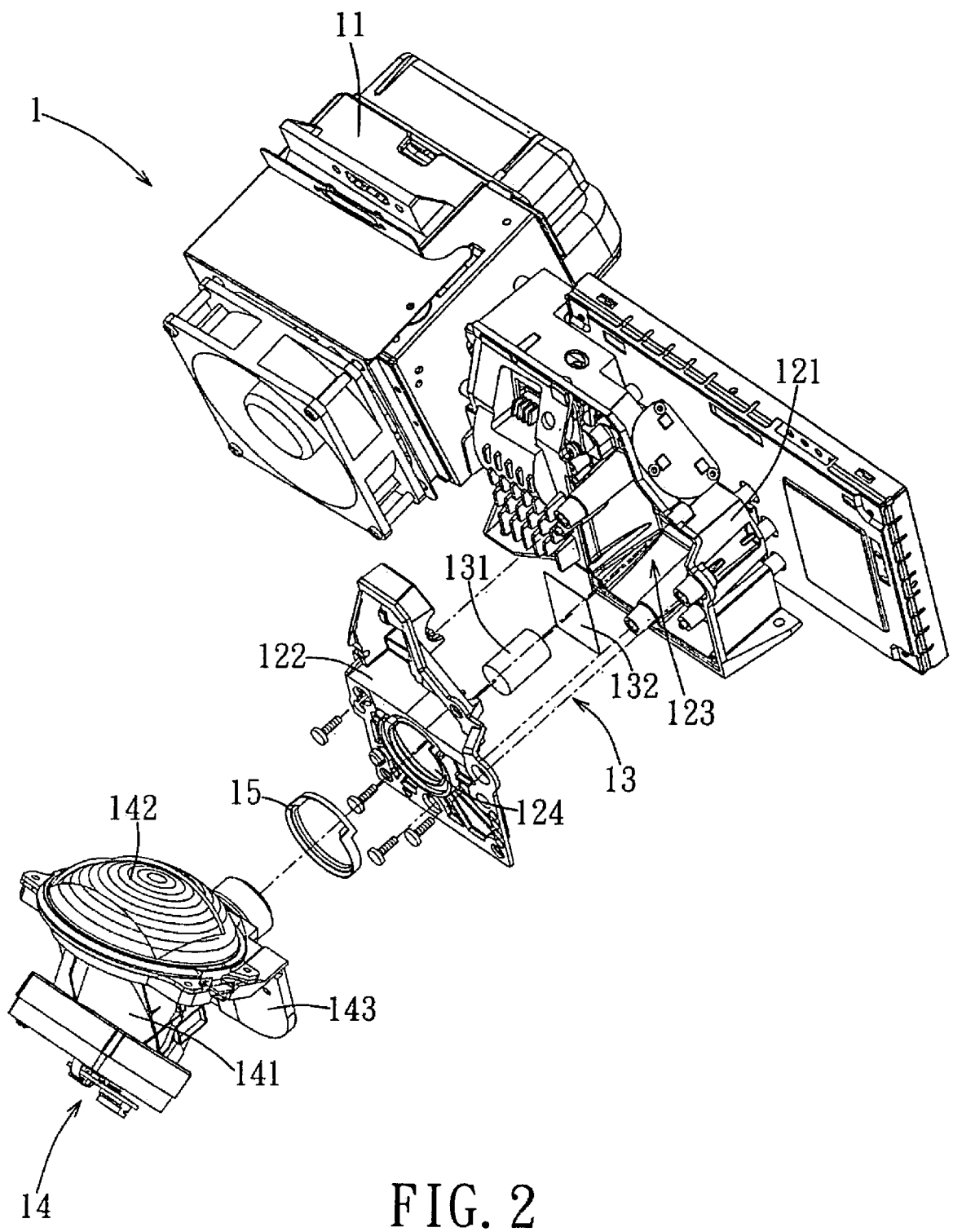
FIG. 2 is a partly exploded perspective view of the conventional optical engine of FIG. 1.

Since the coupling element 53 is coupled to the surrounding wall 22 of the housing 2 in an overlapping manner and is secured thereto through the screws 54, air-tight and dust-proof requirements are met when the coupling element 53 is mounted to the housing 2 such that the receiving space 24 is sealed to prevent dust or other contaminants from entering the receiving space 24 and accumulating on the optical lens set 41 or the display element 42, which may adversely affect display quality. Moreover, since the coupling element 53 and the first barrel portion 511 are formed integrally by injection molding, there is no need to dispose a dust-proofing washer in the optical engine 200. Compared with the prior art, the design of the optical engine 200 does not require an additional mold for the second housing part 122 (refer to FIG. 2). Therefore, the number of components and the design and manufacturing costs of the optical engine 200 are reduced.

It is worth to mention herein that the size of the opening 25 of the housing 2 varies among different models of the optical engines 200. Therefore, by designing the coupling element 53 to correspond in size and shape to the opening 25 of the housing 2, the coupling element 53 can be mounted to the surrounding wall 22 of the housing 2 and cover the opening 25. As such, the size and shape of the opening 25 of the housing 2 and the configuration of the coupling element 53 in the preferred embodiment are not limited to those shown in the drawings.

Figure 7:
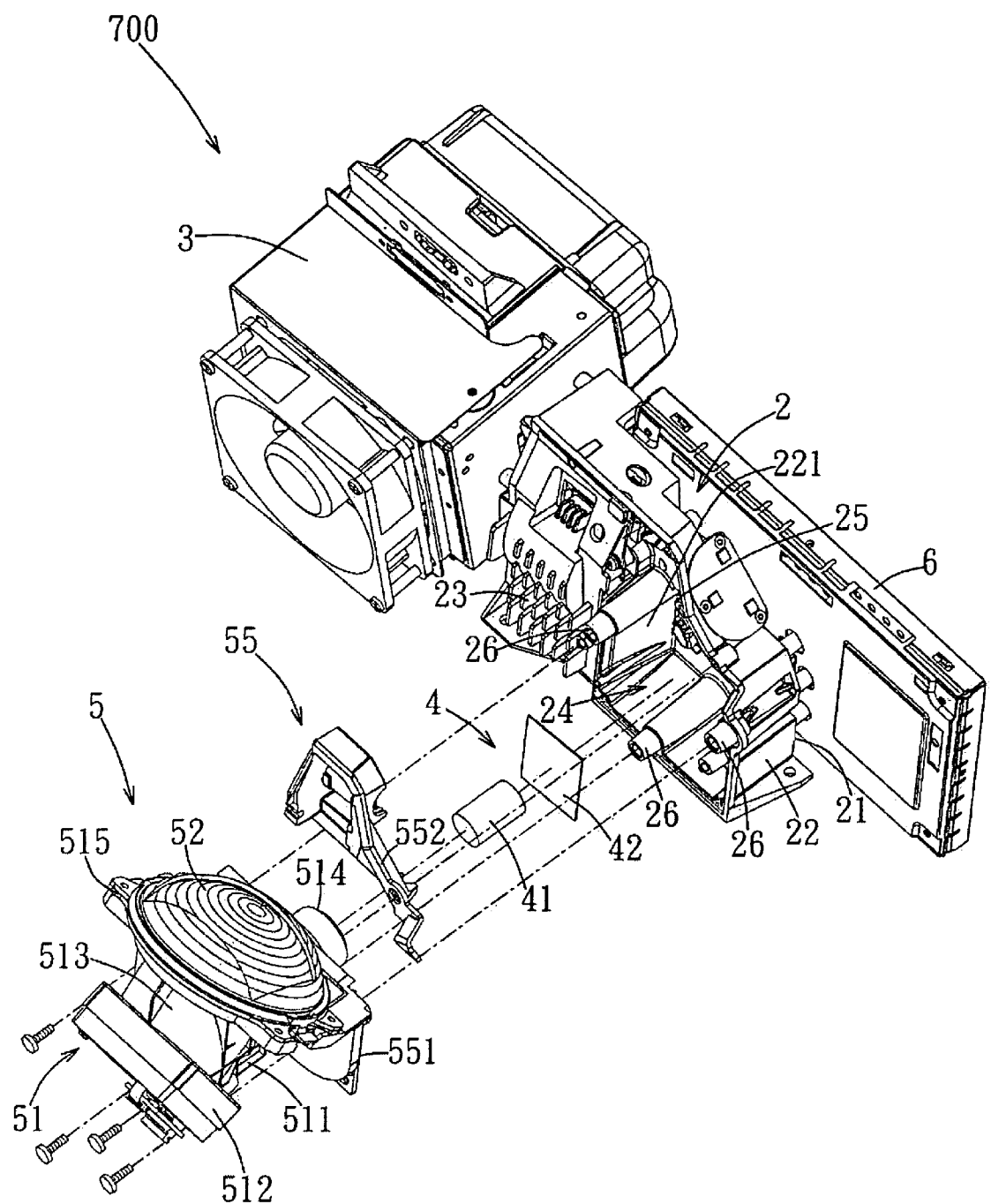
FIG. 7 is a partly exploded perspective view of an optical engine for a projection display device according to a second preferred embodiment of the present invention.

FIG. 7 illustrates an optical engine 700 for a projection display device according to a second preferred embodiment of this invention. While the structure of the optical engine 700 is generally similar to that of the first preferred embodiment, the optical engine 700 differs from the first preferred embodiment in the disposition of a coupling element 55 of the projecting mechanism 5.

The coupling element 55 includes a first coupling portion 551 formed integrally with a first barrel portion 511 of a lens barrel 51, and a second coupling portion 552 coupled to a top end of the first coupling portion 551 in an overlapping manner. The first and second coupling portions 551, 552 are coupled together for forming the coupling element 55 having a size and shape corresponding to those of an opening 25 of a housing 2. The second coupling portion 552 may also be coupled to the first coupling portion 551 using screws (not shown), and should not be limited to the overlapping coupling scheme used in this embodiment. During assembly, the second coupling portion 552 is first coupled to the first coupling portion 551 to form the coupling element 55, and the coupling element 55 is subsequently secured to the surrounding wall 22 of the housing 2 so as to close the opening 25, thereby completing assembly of the coupling element 55 to the housing 2. In view of the detachable connection between the first and second coupling portions 551, 552 of the coupling element 55, in case that the size of the opening 25 of the housing 2 is relatively large, the first and second coupling portions 551, 552 can be separately formed and subsequently interconnected before coupling to the surrounding wall 22 of the housing 2, thereby reducing the size of a mold that forms together the lens barrel 51 and the coupling element 55.

In sum, it is evident from the aforementioned two embodiments that, by forming integrally the coupling element 53, 55 with the first barrel portion 511, there is no need to provide a dust-proofing washer in the optical engine 200, 700, and there is no need to provide a separate mold for a second housing part, thereby reducing the number of components of the optical engine 200, 700 and thereby reducing the design and manufacturing costs. On the other hand, as shown in FIG. 7, since the first and second coupling portions 551, 552 are separately formed and subsequently interconnected before coupling to the surrounding wall 22 of the housing 2, the design is suitable for application when the size of the opening 25 of the housing 2 is relatively large to permit a reduction in the size of a mold that forms together the lens barrel 51 and the coupling element 55. Moreover, each of the coupling elements 53, 55 is coupled to the surrounding wall 22 of the housing 2 in an overlapping manner to cover the opening 25 such that the receiving space 25 is sealed to achieve air-tight and dust-free requirements, thereby achieving the objects of this invention.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like not necessarily limits the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical engine for a projection display device, comprising:
    a housing including a base wall, and a surrounding wall that extends from a side of said base wall and that cooperates with said base wall for defining a receiving space with an opening;
    a light source module disposed at a side of said housing for providing an illuminating light beam into said receiving space;
    an imaging unit including a display element and an optical lens set disposed in said receiving space, said optical lens set being operably associated with said light source module and said display element; and
    a projecting mechanism including
        a lens barrel having a first barrel end and a second barrel end,
        a projecting lens disposed at said second barrel end of said lens barrel, and
        a coupling element formed integrally with said lens barrel and disposed at said first barrel end of said lens barrel, said coupling element being configured to have a size and shape corresponding to those of said opening, and being disposed for covering said opening and sealing said receiving space.

2. The optical engine as claimed in claim 1, wherein said coupling element includes a first coupling portion, and a second coupling portion coupled to said first coupling portion, said first and second coupling portions being coupled together for forming said coupling element having the size and shape corresponding to those of said opening.

3. The optical engine as claimed in claim 1, wherein said lens barrel includes a first barrel portion that is formed integrally with said coupling element, said first barrel portion defines said first barrel end, and said first barrel end is disposed in said receiving space.

4. The optical engine as claimed in claim 3, wherein said lens barrel further includes a seat that is mounted to said first barrel portion, and a second barrel portion that is mounted to said seat and that defines said second barrel end, and said projecting lens is mounted to said second barrel portion.

5. The optical engine as claimed in claim 2, wherein said first coupling portion is formed integrally with said lens barrel.

6. The optical engine as claimed in claim 5, wherein said second coupling portion is coupled to said first coupling portion in an overlapping manner.

* * * * *